US008765027B2

(12) United States Patent
Lussey et al.

(10) Patent No.: US 8,765,027 B2
(45) Date of Patent: Jul. 1, 2014

(54) POLYMER COMPOSITION

(75) Inventors: David Lussey, Richmond (GB); David Bloor, Durham (GB); Paul Laughlin, Houghton-le-spring (GB); Cyril Hilsum, Middlesex (GB)

(73) Assignee: Peratech Limited, Brompton on Swale, Richmond (GB)

( * ) Notice: Subject to any disclaimer, the term of this patent is extended or adjusted under 35 U.S.C. 154(b) by 1226 days.

(21) Appl. No.: 12/598,614

(22) PCT Filed: May 2, 2008

(86) PCT No.: PCT/GB2008/050323
§ 371 (c)(1),
(2), (4) Date: Mar. 17, 2011

(87) PCT Pub. No.: WO2008/135787
PCT Pub. Date: Nov. 13, 2008

(65) Prior Publication Data
US 2011/0253948 A1 Oct. 20, 2011

(30) Foreign Application Priority Data
May 4, 2007 (GB) .................................. 0708702.6

(51) Int. Cl.
*H01B 1/00* (2006.01)
*H01B 1/12* (2006.01)
*H01B 1/02* (2006.01)
*H01B 1/22* (2006.01)
*H01B 1/08* (2006.01)
*H01C 10/10* (2006.01)

(52) U.S. Cl.
USPC ... 252/519.33; 252/500; 252/513; 252/518.1; 252/519.12; 252/519.3; 252/520.1; 252/520.2; 252/521.2; 338/47

(58) Field of Classification Search
USPC .............. 252/500, 513, 518.1, 519.12, 519.3, 252/519.33, 520.1, 520.2, 521.2; 338/47
See application file for complete search history.

(56) References Cited

U.S. PATENT DOCUMENTS

| 4,610,808 A * | 9/1986 | Kleiner .......................... 252/512 |
| 4,726,991 A | 2/1988 | Hyatt et al. |
| 5,294,374 A | 3/1994 | Martinez et al. |
| 5,378,407 A | 1/1995 | Chandler et al. |
| 6,183,668 B1 * | 2/2001 | Debe et al. ..................... 252/510 |
| 2002/0145130 A1 | 10/2002 | Handa et al. |

FOREIGN PATENT DOCUMENTS

| JP | 60137954 | | 7/1985 | |
| JP | 60137954 A | * | 7/1985 | .............. C08L 27/18 |
| WO | 9938173 A | | 7/1999 | |
| WO | WO 2004027787 A1 | * | 4/2004 | .............. H01B 1/00 |
| WO | 2005029514 A | | 3/2005 | |

OTHER PUBLICATIONS

T255 Nickel Powder. Vale Product Specficiations, 2010, p. 1.*
Bloor, D. et al, A metal-polymer composite with unusual properties, J. Phys. D: Appl. Phys. 38 (2005), 2851-2860, Aug. 21, 2005.
Cartlidge, Edwin, Entrepreneur exploits quantum physics, Physics World, IOP Publishing, Bristol, GB, 16(5), May 1, 2003.

* cited by examiner

*Primary Examiner* — Harold Pyon
*Assistant Examiner* — Tanisha Diggs
(74) *Attorney, Agent, or Firm* — Arthur Jacob

(57) ABSTRACT

A polymer composition comprises at least one substantially non-conductive polymer binder and at least first and second electrically conductive fillers. The first electrically conductive filler is comprised of particles having avoid-bearing structure; and the second electrically conductive filler is comprised of particles which are acicular in shape.

13 Claims, 14 Drawing Sheets

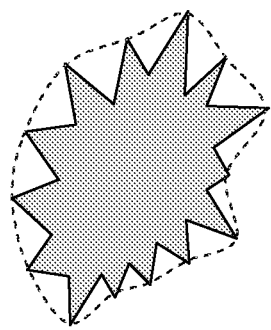 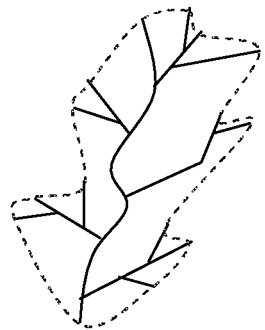
FIG 1a    FIG 1b
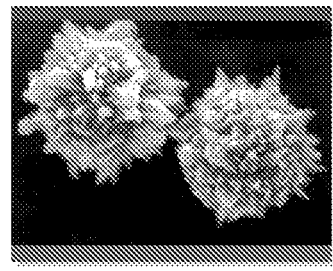
FIG. 2
 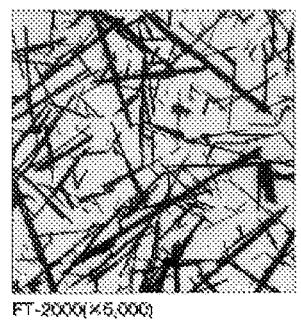 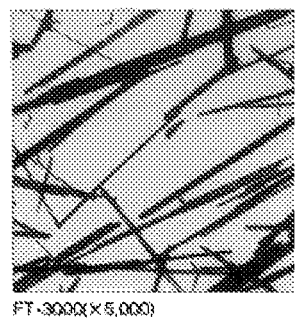
FIG.3a    FIG.3b    FIG.3c

POLYMER COMPOSITION

This is an application filed under 35 U.S.C. 371 of PCT/GB2008/050323, filed May 2, 2008, which claims priority from UK Application 0708702.6, filed May 4, 2007.

FIELD OF THE INVENTION

The present invention relates to a polymer composition and in particular to an elastomeric conductive polymer composition which displays controllable resistance/force characteristics and/or reduced noise level.

BACKGROUND OF THE INVENTION

Elastomeric conductive polymer compositions which exhibit changing electrical resistance when subjected to compressive or tensile forces are known. Such compositions are described in International patent application published under number WO 98/33193 and WO 99/38173.

In WO 98/33193 an elastomeric conductive polymer composition comprises an electrically conductive filler encapsulated in an elastomeric polymer. The material is elastically deformable from a quiescent state in which the material behaves as an electrical insulator to a conductor when subjected to compressive or tensile forces.

In WO 99/38173 a polymer composition is described which comprises a substantially non-conductive polymer and an electrically conductive filler in the form of granules. The composition of WO 99/38173 exhibits very similar electrical characteristics to the composition described in WO 98/33193.

In both WO 98/33193 and WO 99/38173 the electrically conductive filler is in the form of metal or metal alloy having a void-bearing structure. Conduction is by a system known as quantum tunnelling which describes a conduction mechanism which occurs when the interparticle distance decreases such that the insulating barriers between adjacent conductive particles are so thin that quantum tunnelling occurs through the thin insulating barriers. The presence of voids on the filler particles, such as is found in spiky and dendritic forms, amplifies the electric fields within these composites. The extremely large resistance ranges achieved are a consequence of this field-enhanced quantum tunnelling.

Such field-enhanced tunnelling occurs with filler particles that contain voids. We define voids by considering an imaginary closed surface tracing the protrusions on the particles, as shown in FIG. 1a (spiky particle) and FIG. 1b (dendritic particle). If the volume enclosed by the imaginary closed surface is larger than the volume of the filler particle this indicates the existence of protrusions on the filler particles. These protrusions are the source of field-enhanced tunnelling, the degree of field enhancement being dependent upon the number and sharpness of these protrusions. We make the distinction here between voids in filler particles due to the presence of protrusions (as shown in FIG. 1a and FIG. 1b), and voids in hollow materials such as carbon nanotubes. It is the former definition that we reference throughout, where the voids are due to external protrusions rather than internal hollows.

WO 98/33193 and WO 99/38173 describe composites manufactured with void-bearing filler particles, including techniques to maintain the voids in the filler particles during manufacture of the composites. The phenomenon of quantum tunnelling is described in greater detail below:

In the compositions described in WO 98/33193 and WO 99/38173 a coating of insulating polymer surrounds every particle, even when the composite is subjected to large deformation. When conduction takes place, it is through the polymer layer, which means that it depends on electrons having sufficient energy, that is, the 'tunnel' effect. Consistent with this the resistance of the composite displays an exponential dependence on deformation the magnitude of the resistance range being dependent upon the number and sharpness of protrusions on the filler particles.

Tunnelling is a consequence of the wave mechanical description of the electron. When a "free" electron, e.g. an electron in a metal moving under the influence of an external electric field, impinges on a non-conducting barrier of width a with a height ($U_0$), which is greater than that of the energy of the electron (E), the wave function behaves as shown in FIG. 1.

Within the barrier the wave function decays exponentially. The ratio of the wave function amplitude squared on either side of the barrier is a measure of the probability that the electron penetrates the barrier. The transmission coefficient, T, is defined as:

$$T = e^{-2\kappa a}, \kappa = \sqrt{2m(U_o - E)/\eta^2}$$

where m is the electron mass and η is is Planck's constant divided by 2π. This transmission coefficient (T) is also the fraction of all incident electrons of energy E that penetrate the barrier. Thus, in macroscopic terms it determines the fraction of an incident current transmitted through the insulating barrier. When the barrier is very thin, i.e. of atomic dimensions, T is approximately one and the barrier does not impede the current.

A more detailed description of field-assisted tunnelling can be found in D. K. Roy, Quantum mechanical tunneling and its applications, World Scientific, Singapore, 1986.

Tunnelling is a pervasive phenomenon. If two metallic objects are brought into contact there will be a thin barrier due to oxide and other contaminants on the surfaces. Such intrinsic barriers are very thin and as a result allow a current to flow with negligible loss. Such intrinsic barriers do not constitute the principal factor determining the resistance of a conventional percolative composite. In this case the number of percolation pathways, formed by particles in intimate contact in the as made composite will determine the resistance. The number of percolative pathways can be increased by external pressure in conventional percolative composites.

In the composites described in WO 98/33193 and WO 99/38173 the particles are completely wetted by the polymeric medium. This has been shown conclusively by the fact that mechanical failure of the composite occurs in the polymer matrix and not at the particle polymer interface. Fracture surfaces have also shown that there are no voids remaining in the composite as a whole, i.e. the voids of the filler are infilled with elastomer. Thus, a coating of insulating polymer surrounds every particle, even when the composite is subjected to large deformation. This coating forms an extrinsic barrier, which is of variable thickness and which determines the resistance of the composite. In the as made composite the barriers are thick and the transmission coefficient (T) tends to zero. Thus, even for loading of metal particles higher than the threshold at which percolation pathways form in conventional composites, the composites described in WO 98/33193 and WO 99/38173 remain insulating. However, under these conditions there are incipient conductive paths through the composite that become conductive as the barrier separation is reduced and T increases. Deformation of the composite reduces the average barrier thickness between particles whatever the deformation because of the nature of the deformation of the polymer matrix. The effect of compression is obviously to decrease the separation of the metal particles. This will also occur for other deformations because of the large Poisson's ratio of the elastomeric matrix, i.e. the large reduction in lateral dimensions when the matrix is stretched. Thus, the resistance of the composite displays an exponential dependence on deformation, even for elongation.

The reduction in resistance exhibited by the composites described in WO 98/33193 and WO 99/38173 is a result that is not found in conventional composites, where the resistance is determined by the presence of percolation.

Whilst the materials described in WO 98/33193 exhibit extreme changes in resistance when subject to force, it has been found that a significant amount of noise is associated with an electrical signal passing through the material. In some applications a material having an improved signal to noise ratio would be desirable. In fact, such a material may have a wider range of uses than the materials described in WO 98/33193.

As mentioned above, the electrically conductive particles used in the composite materials of WO 98/33193 and WO 99/38173 are void-bearing, such as spiky or dendritic. Other shapes of electrically conductive particles are also known. For example, electrically conductive particles having an acicular or platy shape are known. In particular acicular electro-conductive tin oxide fine particles and processes for producing the same are described in U.S. Pat. No. 5,575,957 and U.S. Pat. No. 5,705,098. Such particles are not, generally, void-bearing.

Acicular electro-conductive titanium oxide and acicular or platy titanium sub oxides and processes for producing the same are described in U.S. Pat. No. 4,880,703 and U.S. Pat. No. 5,320,782 respectively.

The known acicular materials have been developed principally for use as an anti-static agents in materials which support recording materials such as electrophotocopying paper.

As is noted in U.S. Pat. No. 4,880,703 electrical conductivity-imparting agents of an acicular form (including fibrous form), as compared with spherical form, and furthermore the agents which are lower in their powder resistivity, namely, higher in electrical conductivity, can give resin articles and rubber articles the desired conductivity even with the addition thereof in a small amount to the article.

Compositions made using acicular materials of the type described above are typically used to form a uniform and continuous electro-conductive layer on the surface of a substrate which provides a constant resistance for applications such as electrostatic discharge (ESD). In these materials, conduction is by percolation.

Also known are devices for measuring force consisting of a film of semi-conductor particles in a binder. Such devices are described by Eventoff in U.S. Pat. No. 4,314,227. In these devices a large number of contact points emerge irregularly from the semi-conductor surface, so that a pressure change on the electrodes causes a change in the number of contacts made between the semi-conductor film and the electrodes.

U.S. Pat. No. 5,541,570 describes a force sensing ink and an improved force sensor. The ink comprises a high temperature binder, intrinsically semi-conductive particles, and conductive particles. The intrinsically semi-conductive particles are typically formed from molybdenum disulfide, ferric or ferrous oxide particles, and the conductive particles comprise at least one conductive metal particle. The change in resistance when a load is applied to the ink described in U.S. Pat. No. 5,541,570 can be changed by altering the relative proportions of conductive and semi-conductive particles.

WO 98/33193 and WO 99/38173 each describe a polymer composition which exhibits a vast change in resistance when subjected to a load. It would be desirable to be able to provide a material having a desirable change in resistance when subject to known pressure. Furthermore, it would be desirable to be able to utilise alternative manufacturing techniques for materials that display the properties described in WO 98/33193 and WO 99/38173

The materials described in WO 98/33193 and WO 99/38173 generally exhibit extremely high start resistance (of the order of $10^{14}$ Ohms). In some applications a material having a lower start resistance would be desirable. Manipulation of the start resistance for the materials of WO 98/33193 and WO 99/38173 is possible by mechanical means. However, this requires the use of binders that display relatively high shrinkage upon cure, resulting in internal stresses within the material, thereby giving rise to a start resistance.

The present invention seeks to provide a material which exhibits a change in resistance when subject to a force having improved electrical characteristics when compared to the materials described in WO 98/33193 and WO 99/38173, and also facilitating alternative manufacturing techniques.

The inventors have found that in a composite as described in WO 98/33193 and WO 99/38173 addition of acicular material allows the resistance-compression behaviour of the composites to be controlled in terms of sensitivity of the composites to compression (i.e. resistance value at a certain compression) and rate of change of resistance with compression. Furthermore, electrical noise that exists in materials described in WO 98/33193 and WO 99/38173 is reduced significantly by the addition of acicular material.

Further, the inventors have found that alternative manufacturing methods to those described in WO 98/33193 and WO 99/38173 are facilitated by the use of solvent- or water-based polymers, which enables the use of alternative processing techniques to those afforded by WO 98/33193 and WO 99/38173.

The inventors have also found that in a force sensing material of the type described by Eventoff in U.S. Pat. No. 4,314,227, acicular filler materials operate in a subtly different way to the particles forming the prior art force sensing materials. In force sensors of the prior art protruberances on the surface are roughly conical in shape. A change in resistance results when force is applied due to the top electrode undergoing slight deformation, thereby bringing it into contact with more protuberances.

Where acicular filler materials are added to a material of the type generally described in U.S. Pat. No. 4,314,227 a different effect occurs. In addition to electrode distortion causing more contact points, two additional effects are believed to occur. First, assuming that the needles are arranged in a substantially random fashion within the polymer, a high proportion will be at an angle to the surface. Pressure on the tip of the acicular shaped filler materials will cause bending thereof, thereby increasing the surface area of contact between the acicular filler materials and the electrodes. This effect will be significant for those needle shaped filler materials oriented between 30° and 80° to the normal. For needle shaped filler materials oriented at less than 30° the behaviour is similar to that of the cones of earlier patents. For those oriented at an angle of greater than 80° the filler materials are effectively lying in the surface and are supported, so will not bend. With random orientation nearly 70% of needle shaped filler materials will bend under pressure, thereby increasing sensitivity. Second, for needles oriented at an angle greater than 45°, which account for about 70% of the total, pressure will flatten the curved surface in a way which is not possible for the cones of the prior art. A larger contact area is therefore brought into contact with the electrode, so increasing sensitivity.

Further, in mixtures of void-bearing and acicular filler particles in solvent- or water-based polymers, by adjusting the relative proportions of void-bearing and acicular filler particles the start resistance and resistance-force response of the composites may be controlled.

SUMMARY OF THE INVENTION

According to the present invention there is provided a polymer composition comprising at least one substantially non-conductive polymer binder and at least first and second electrically conductive filler materials, wherein the first electrically conductive filler is comprised of particles having a void-bearing structure; and the second electrically conductive filler is comprised of particles which are acicular in shape.

According to another aspect of the invention, there is provided a method of manufacturing a polymer composition comprising at least one substantially non-conductive polymer binder and at least first and second electrically conductive filler materials, wherein the first electrically conductive filler is comprised of particles having a void-bearing structure; and the second electrically conductive filler is comprised of particles which are acicular in shape, the method including the step of mixing together the said binder, the said first electrically conductive filler and the said second conductive filler.

According to a further aspect of the invention, there is provided a polymer composition comprising at least one substantially non-conductive solvent- or water-based polymer binder and at least one electrically conductive filler, wherein the electrically conductive filler is comprised of particles having a void-bearing structure.

A further aspect of the invention relates to a method of manufacturing a polymer composition comprising at least one substantially non-conductive solvent- or water-based polymer binder and at least one electrically conductive filler, wherein the electrically conductive filler is comprised of particles having a void-bearing structure comprising the steps of mixing together the said non-conductive solvent- or water-based polymer binder and the said electrically conductive filler.

According to yet another aspect of the invention, there is provided a polymer composition comprising at least one substantially non-conductive polymer binder and at least one electrically conductive filler, wherein the electrically conductive filler is comprised of particles which are acicular in shape. The polymer binder may be solvent- or water-based.

A further aspect of the invention relates to a method of manufacturing a polymer composition comprising at least one substantially non-conductive solvent- or water-based polymer binder and at least one electrically conductive filler, wherein the electrically conductive filler is comprised of particles which are acicular in shape, comprising the steps of mixing together the said non-conductive solvent- or water-based polymer binder with the said electrically conductive filler.

According to another aspect of the invention there is provided an electrical charge storage medium, wherein the medium comprises at least one substantially non-conductive polymer binder and at least one electrically conductive filler material, and wherein the amount of charge stored by the medium may be tuned by changing the relative amounts of filler to binder and/or adjusting the types and/or relative proportions of electrically conductive filler. The electrically conductive filler material may comprise particles having a void bearing structure and/or particles which are acicular in shape.

Preferred aspects of the invention are set out in the claims, the description and the Figures.

Whilst the dictionary definition of acicular is needle shaped, in the context of this patent application acicular shall be deemed to mean any particle having an aspect ratio greater than 1, i.e. a particle which is longer than it is wide. Such an acicular shaped particle need not necessarily have a smooth surface, and may include voids. However, where such a particle does include voids, resulting from protrusions from the surface of the particle, such protrusions would be substantially fewer in number and/or substantially less sharp than those of the particles illustrated in FIGS. 1a and 1b.

BRIEF DESCRIPTION OF THE FIGURES

In the Figures, which relate to preferred embodiments of the invention and are by way of example:

FIG. 1a is a two-dimensional illustration of the definition of void-bearing spiky particles set out in this specification;

FIG. 1b is a two-dimensional illustration of the definition of void-bearing dendritic particles set out in this specification;

FIG. 2 is an illustration of the shape of particles of Nickel 123;

FIG. 3a is an illustration of a material known as FT-1000 at a magnification of 5000;

FIG. 3b is an illustration of a material known as FT-2000 at a magnification of 5000;

FIG. 3c is an illustration of a material known as FT-3000 at a magnification of 5000;

FIGS. 4 to 6 relate to materials manufactured with nonsolvent-based binders.

FIG. 4 is a graph showing resistance v compression for three compositions of material according to the invention;

FIGS. 7 to 13 relate to materials manufactured with solvent-based binders.

FIG. 7 is a graph illustrating resistance v force for a number of samples of quantum tunnelling composite, each sample containing different relative amounts of Ni 123 and FT-2000 when the resistance of the sample is being measured transverse to the direction of application of force to the sample;

FIG. 8 is a graph illustrating resistance v Ni123% age for three different applied forces, the resistance of the sample being measured transverse to the direction of application of force to the sample;

FIG. 9 is a graph illustrating resistance v force for a number of samples of quantum tunnelling composite, each sample containing different relative amounts of Ni 123 and FT-2000 when the resistance of the sample is being measured axially to the direction of application of force to the sample;

FIG. 10 is a graph illustrating resistance v Ni123% age for three different applied forces, the resistance of the sample being measured transverse to the direction of application of force to the sample;

FIG. 11a is a graph of resistance v force where the proportions of Ni123 and FT-2000 are 100% and 0% respectively;

FIG. 11b is a graph of resistance v force where the proportions of Ni123 and FT-2000 are 90% and 10% respectively;

FIG. 11c is a graph of resistance v force where the proportions of Ni123 and FT-2000 are 60% and 40% respectively;

FIG. 11d is a graph of resistance v force where the proportions of Ni123 and FT-2000 are 30% and 70% respectively;

FIG. 11e is a graph of resistance v force where the proportions of Ni123 and FT-2000 are 0% and 100% respectively;

FIG. 12 is a graph showing the ratio of transverse resistance $R_t$ to axial resistance $R_a$ v a changing proportion of Ni 123 and FT-2000 in the quantum tunnelling composite;

FIG. 13 is a graph showing axial resistance $R_a$ v changing proportion of Ni 123 and FT-2000 for two ratios of resistances the first ratio being the resistance measured at 10 g applied force over the resistance measured at 1000 g force, and the second ratio being the resistance measured at 10 g force over the resistance measured at 5000 g force;

DETAILED DESCRIPTION OF EMBODIMENTS OF THE INVENTION

Referring now to FIG. 2, there is shown an electron-microscope image of a particle which is available commercially under the name Nickel 123. This material comprises particles which are substantially spherical with spikes on the surface thereof. This is one of the materials which may comprise the electrically conductive filler in the material described in WO 98/33193 and WO 99/38173. As described in detail in the aforementioned WO 98/33193 and WO 99/38173, a quantum tunnelling composite material is formed by mixing a void-bearing material such as Nickel 123 with a polymer binder. The disclosures of WO 98/33193 and WO 99/38173 are disclosed herein by reference and details of possible binders and electrically conductive fillers can be found in greater detail in those documents.

The structure of commercially available powder products sold under the names FT-1000, FT-2000, and FT-3000 are shown in FIGS. 3a to 3c respectively. As can be seen from these images, the individual particles of the powder are acicular in shape. These "FT" powder products comprise titanium dioxide coated with tin oxide which has been doped with antimony. Whilst the "FT" powders are suitable acicular shaped fillers, other electrically conductive fillers having a substantially acicular shape may also be suitable.

EXPERIMENTS

Experiment I

In order to perform experiments three samples of quantum tunnelling composite were manufactured as shown in the table below using elastomeric silicone rubber polymer typical of the polymer type used in quantum tunnelling material described in WO 98/33193:

TABLE 1

| Sample | Silicone/g | Ni 123/g | FT2000/g |
|---|---|---|---|
| 1 | 10 | 50 | 0 |
| 2 | 10 | 50 | 2 |
| 3 | 10 | 50 | 4 |

Figure 1:
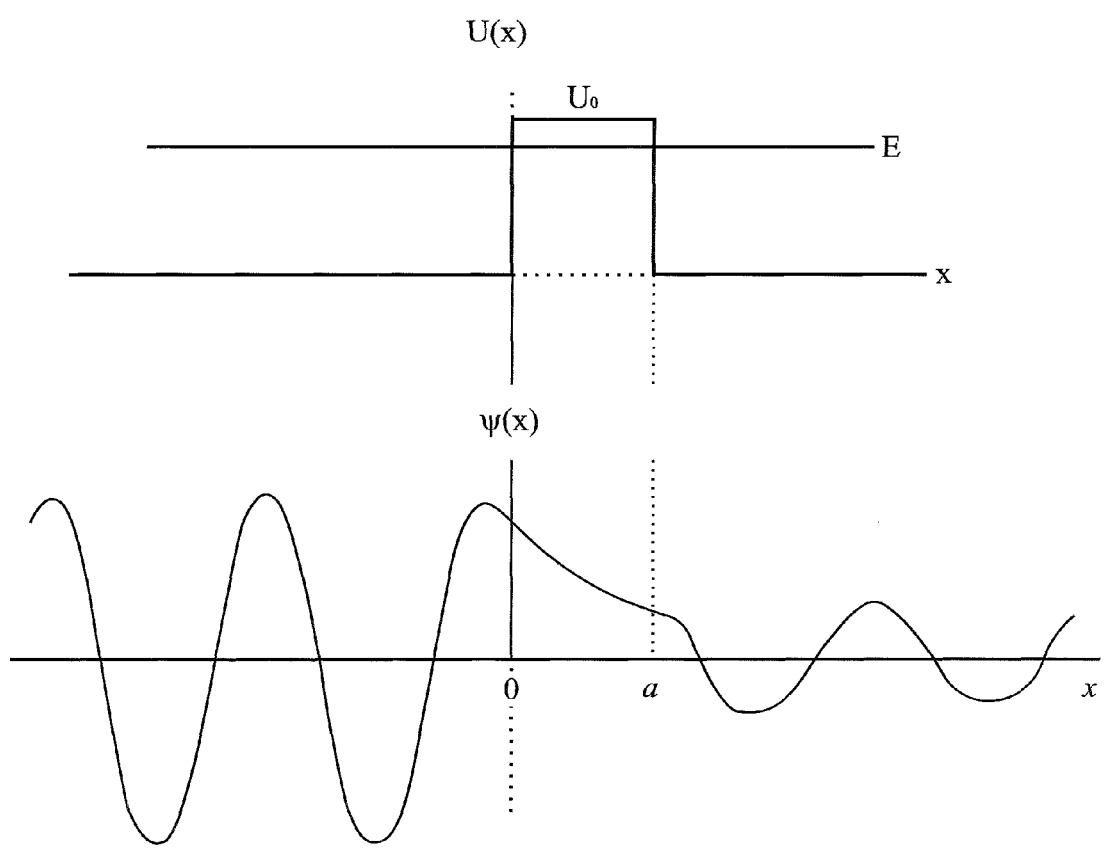
FIG. 1 is a graphical illustration of the wave function of an electron impinging on a non-conducting barrier.
Figure 4:
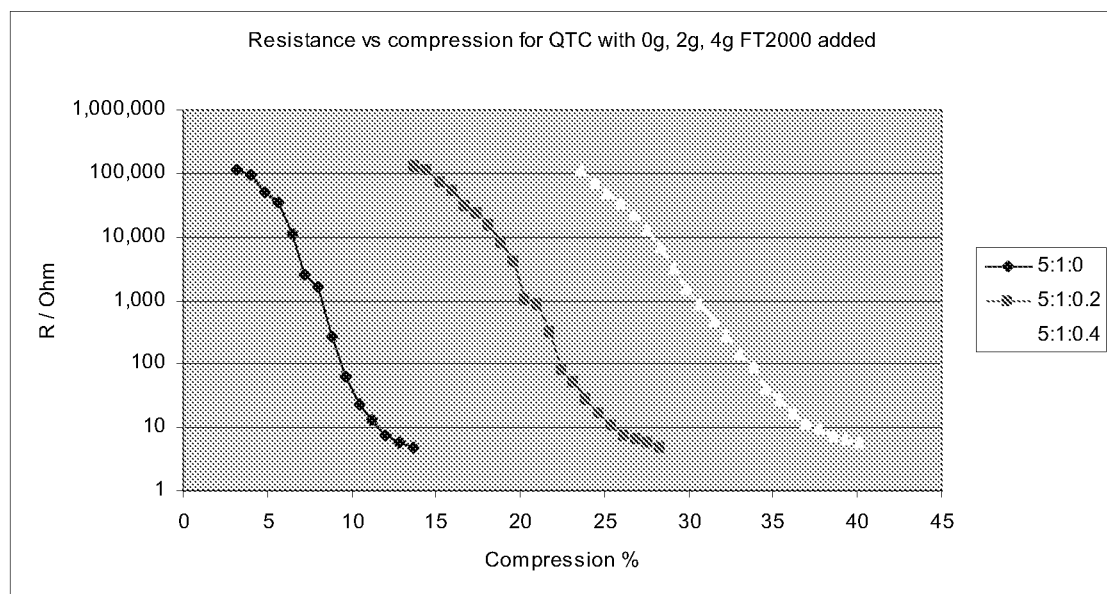

FIGS. 4 to 6 relate to experiments conducted on the materials of samples 1 to 3, i.e. loadings of FT-2000 of 0, 2 and 4 grams respectively.

The graph illustrated in FIG. 4 shows that adding FT-2000 reduces the sensitivity of samples to compression. Also, rate of change of resistance with compression is reduced with increasing amount of FT-2000 as indicated by the reducing steepness of slope as the proportion of FT-2000 is increased. Both these phenomena allow a quantum tunnelling composite to be tuned to a particular force region of interest.

The effects illustrated in FIG. 4 may be explained in mechanical and/or electrical terms. Adding FT-2000 to the material makes the samples stiffer, which affects the 3-dimensional change in dimensions of the sample when subjected to a force, i.e. a softer sample will deform more laterally under axial compression compared to a harder sample. In addition to or alternatively, the addition of FT-2000 may have an electrical effect upon the response of the samples, in that it may have the effect of reducing the field enhancement at the tips, therefore reducing the probability of tunnelling.

Figure 5A:
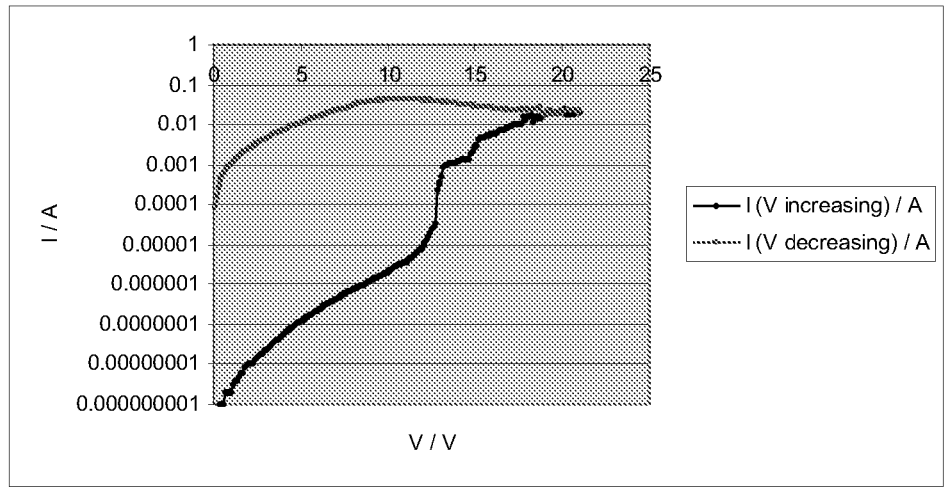
FIG. 5a is a graph of current v voltage for a sample of quantum tunnelling composite including no electrically conductive acicular shaped particles under low compression.
Figure 5B:
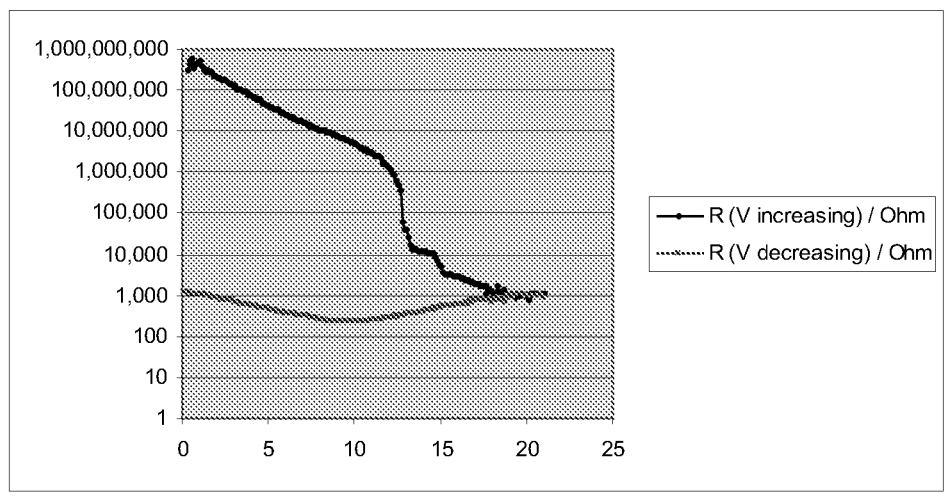
FIG. 5b is the graph illustrated in FIG. 5a plotted as resistance v voltage.

The graphs illustrated in FIGS. 5a to 5d show the current voltage relationship when a voltage is applied across a QTC material, the voltage first being increased and then decreased. FIG. 5a illustrates the current/voltage characteristic of Sample 1 when subject to a relatively low compression. FIG. 5b uses the same data as FIG. 5a but is plotted as resistance v voltage. What is clear is that the start resistance is high and this falls as the voltage is increased. As the voltage is reduced the resistance remains substantially constant, i.e. the resistance remains within a band of around 500 ohms, with the end resistance being substantially different from the start resistance.

Figure 5C:
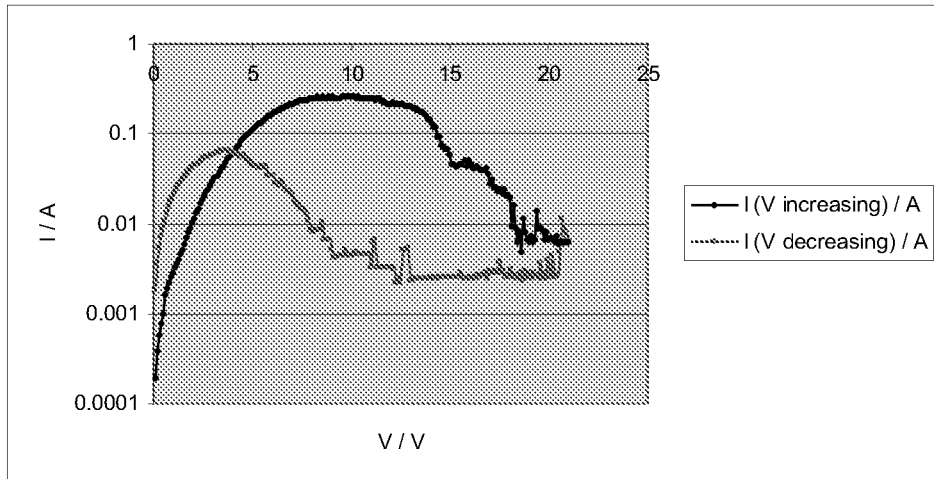
FIG. 5c is a graph of current v voltage for the same sample of quantum tunnelling composite used in relation to FIG. 4a but under high compression.
Figure 5D:
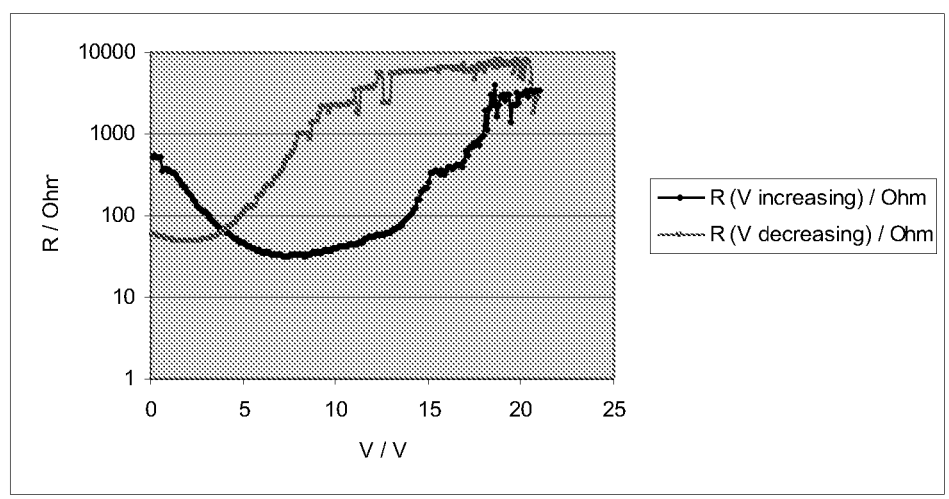
FIG. 5d is the graph illustrated in FIG. 5c plotted as resistance v voltage.

FIG. 5c illustrates the current/voltage characteristic of Sample 1 when subject to a relatively high compression, i.e. low initial resistance. FIG. 5d uses the same data as FIG. 5c but is plotted as resistance v voltage.

Under both low and high compression the Sample 1 material exhibits significant hysteresis. This behaviour is largely due to charge building up on electrically conductive particles which are not in conductive pathways, which creates internal electromagnetic fields. The forces arising from such field effects may change the shape of the sample. When the potential difference driving current through the sample is removed, built-up charge remains in the material. The configuration of particles within the material may be distorted due to forces resulting from the build up of charge, and the material may therefore have an end value of resistance somewhat different to that at the beginning. The built-up charge may be removed by applying a large compressive force, which has the effect of reducing the distance between particles and hence the thickness of electrically insulating material between the particles.

In addition to significant hysteresis, and best illustrated in FIGS. 5c and 5d, the output signals from the QTC material are accompanied by significant levels of noise. This noise is associated with charge movement and may be a significantly greater problem than highlighted in FIGS. 5c and 5d owing to the low frequency sampling rate used.

FIGS. 6a to 6d show comparative information for the Sample 3 material. It is clear that the introduction of an acicular material into the QTC composite results in considerably reduced hysteresis and noise.

Figure 6A:
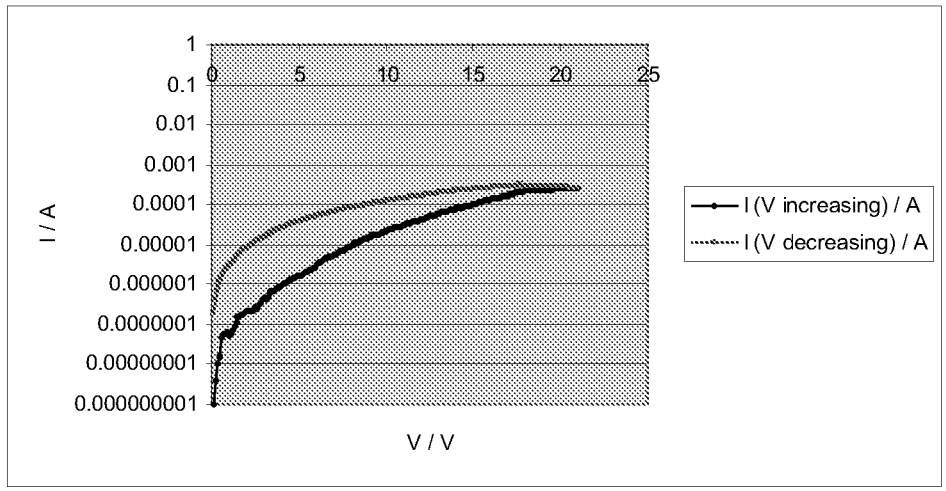
FIG. 6a is a graph of current v voltage for a sample of quantum tunnelling composite including an amount of electrically conductive filler, the individual particles of which are acicular in shape, the sample being under low compression.
Figure 6B:
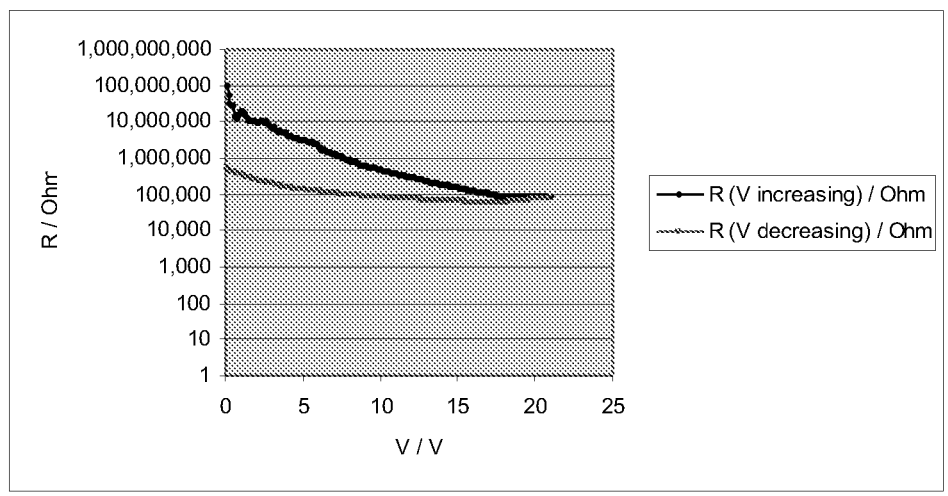
FIG. 6b is the graph illustrated in FIG. 6a plotted as resistance v voltage.

Under low compression as illustrated in FIGS. 6a and 6b, hysteresis is still present but is much less severe than for the Sample 1 material.

Figure 6C:
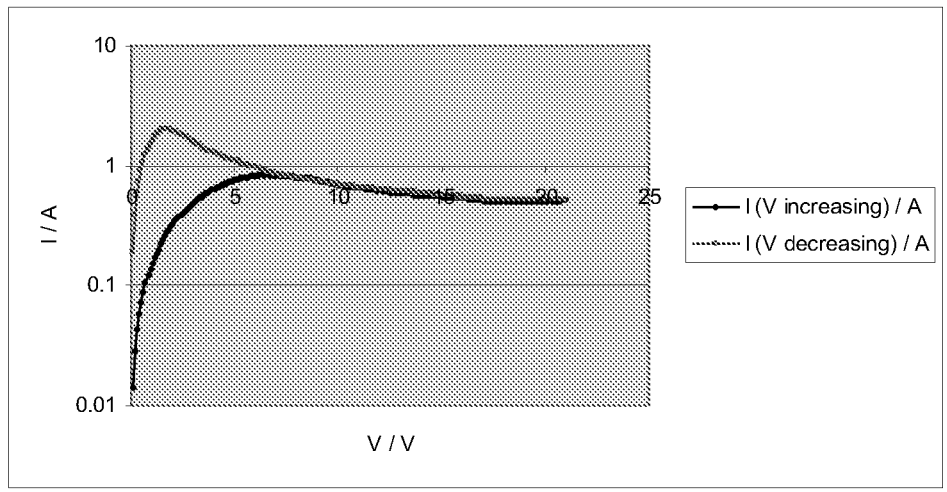
FIG. 6c is a graph of current v voltage for the same sample of quantum tunnelling composite used in relation to FIG. 6a, but under high compression.
Figure 6D:
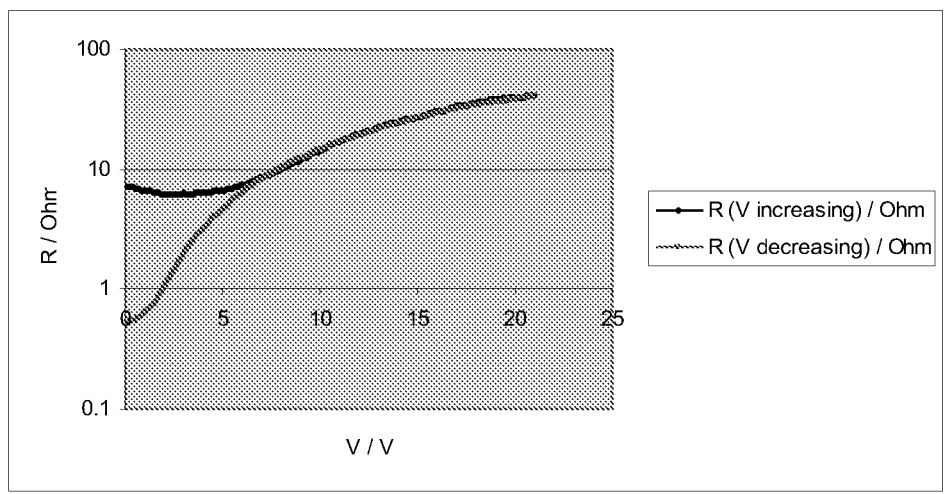
FIG. 6d is the graph illustrated in FIG. 6c plotted as resistance v voltage.

Under high compression, FIGS. 6c to 6d, there is a small amount of hysteresis, the curves representing increasing and decreasing voltage come together at the higher voltages.

The reduction in hysteresis and noise is considered to be due to less charge being stored in the material as a result of the addition of FT-2000. The reductions are greater when the sample is subjected to greater pressures as the thickness of the barriers between particles is reduced, thereby making conduction by tunnelling between particles easier.

Experiment II

Quantum tunnelling composites were manufactured using a solvent-based polymer binder, in the present example Polyplast PY383, with various loadings of Ni123 and FT-2000 in powder form. The total amount of powder mixed with the polymer was held constant, with the relative volume amounts of Ni123 and FT-2000 being varied, as shown in Table 2.

TABLE 2

| Ni123 % | 100 | 90 | 80 | 70 | 60 | 50 | 40 | 30 | 20 | 10 | 0 |
|---|---|---|---|---|---|---|---|---|---|---|---|
| FT2000 % | 0 | 10 | 20 | 30 | 40 | 50 | 60 | 70 | 80 | 90 | 0 |

The volume ratio of uncured polymer binder to filler was 1:0.13 for all samples.

Figure 7:
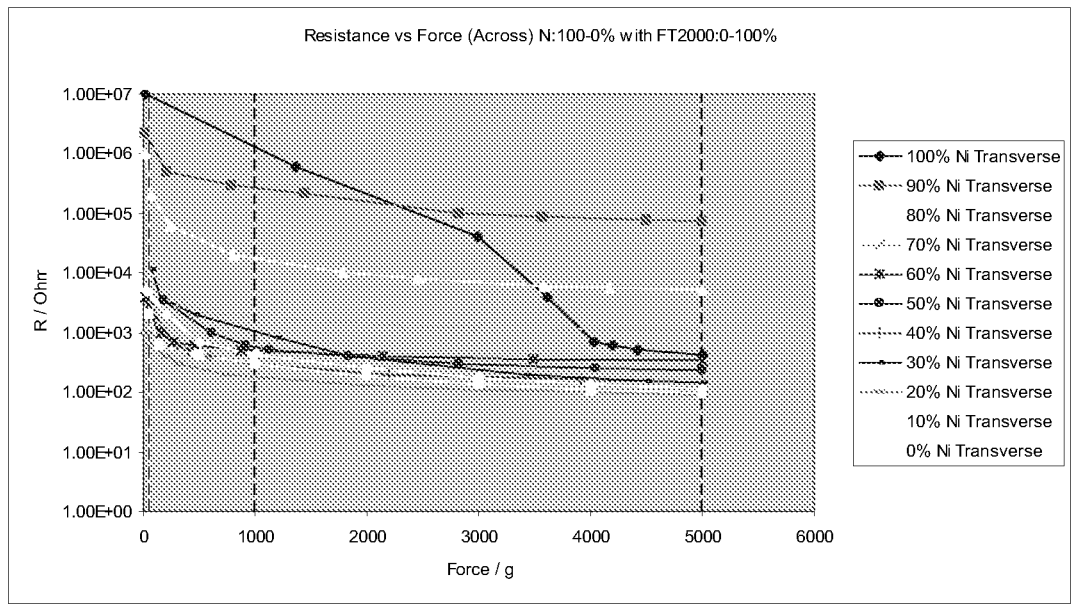
Figure 8:
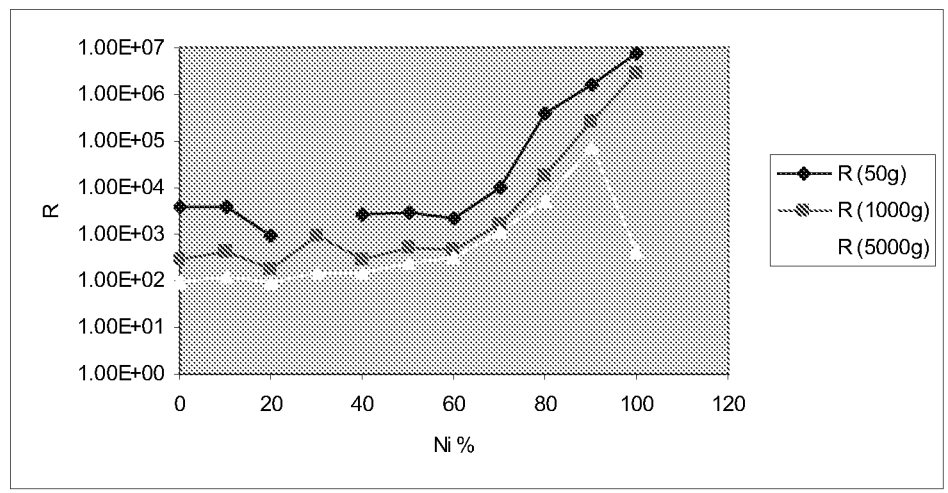

Referring now to FIGS. 7 and 8, these graphs relate to resistance of the sample being measured transverse to the direction of application of force. FIG. 7 shows that by manipulating the relative amounts of Ni123 and FT-2000 the start and end resistances can be changed. For samples having a Ni123 content of up to 90% the rate of change of resistance upon application of increasing force is substantially similar irrespective of the relative proportions of Ni123 and FT-2000. However, within the range between 90% and 100% Ni123 the rate of change of resistance with application of force changes considerably.

FIG. 8 shows plots of resistance v nickel content for three specific compression forces. The three compression forces are 50 grams (top line), 1000 grams (middle line) and 5000 grams (bottom line). The graph shows the resistance at a particular force to be substantially constant up to a nickel loading of 60% above which the resistance of the material at a particular force increases exponentially with increasing nickel content. The fall in resistance exhibited by the sample containing 100% nickel where a force of 5000 g is applied corresponds to the FIG. 7 plot for the 100% nickel sample where resistance continues to fall when forces of over 2000 g are applied. This demonstrates that the quantum tunnelling composite without FT-2000 changes resistance over a much wider range than the composite which includes FT-2000.

Figure 9:
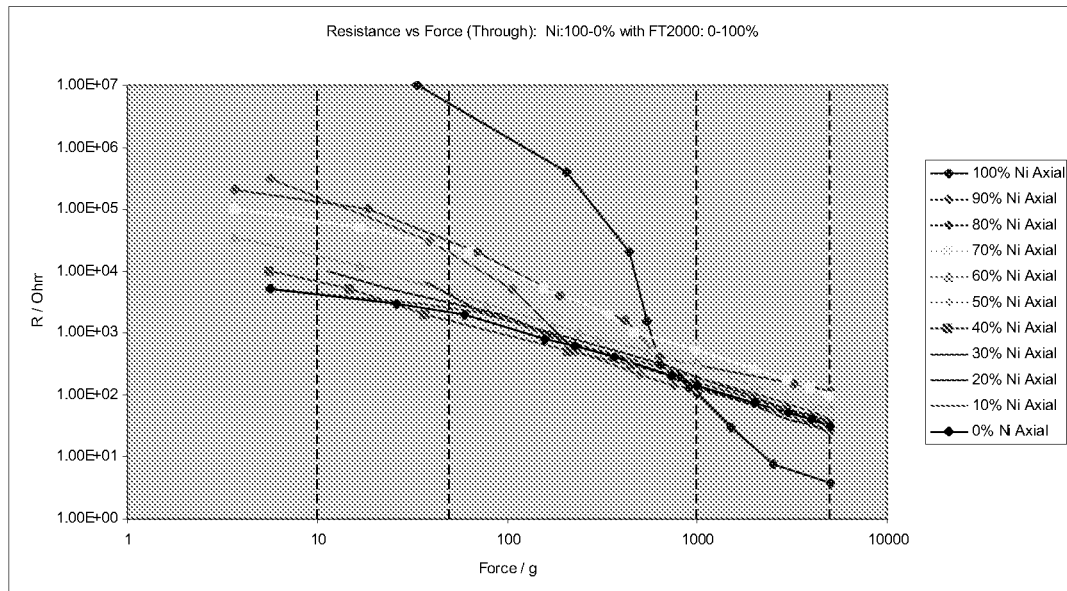
Figure 10:
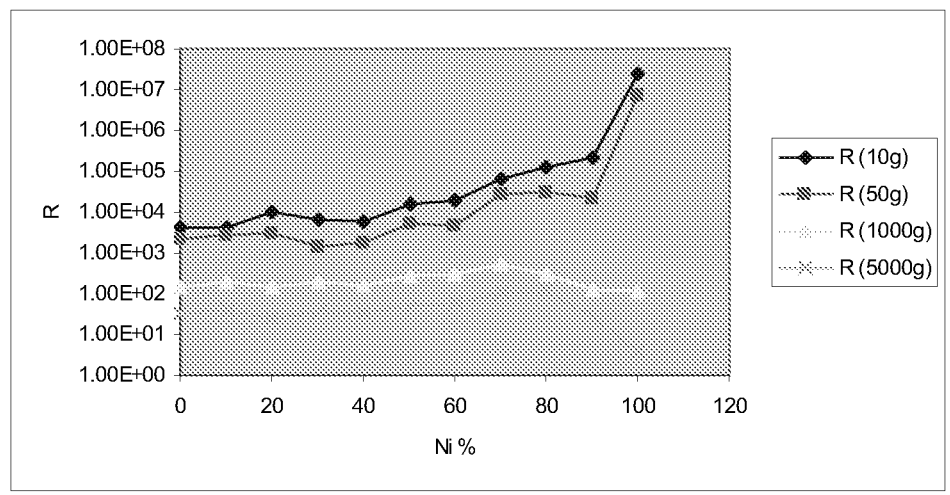

Referring now to FIGS. 9 and 10, these graphs relate to resistance being measured axially to the direction of application of force thereto. FIG. 9 shows that whilst the start and end resistances are different for different relative loadings of Ni123 and FT-2000, up to a loading of 80% Ni123 the rate of change of resistance with increasing force is similar. Above a loading of 80% Ni123 the rate of change of resistance with increasing force changes, with the response for 100% Ni123 content being similar to but more extreme than the response of the sample containing 90% Ni123.

FIG. 10 shows how resistance changes with increasing Ni123 content for four forces, namely 10 grams (top line), 50 grams (second line), 1000 grams (third line) and 5000 grams (bottom line). These graphs show that with loads of 1000 grams and 5000 grams when a nickel content of about 80% is reached, increasing the amount of nickel causes the resistance to fall. Up to around 80% Ni123 for a force of 1000 grams or 5000 grams the resistance is substantially constant.

Figure 11A:
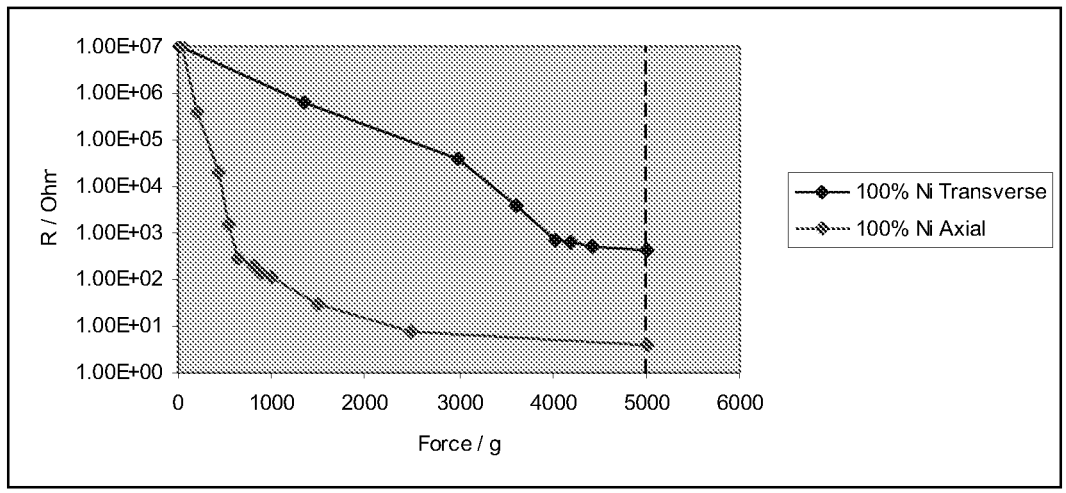
FIGS. 11a to 11e are graphs of resistance v force for different proportions of Ni123 and FT-2000 in a quantum tunnelling composite, the graphs showing plots where resistance is measured both transverse and axially to the direction of application of force, and in particular.
Figure 11B:
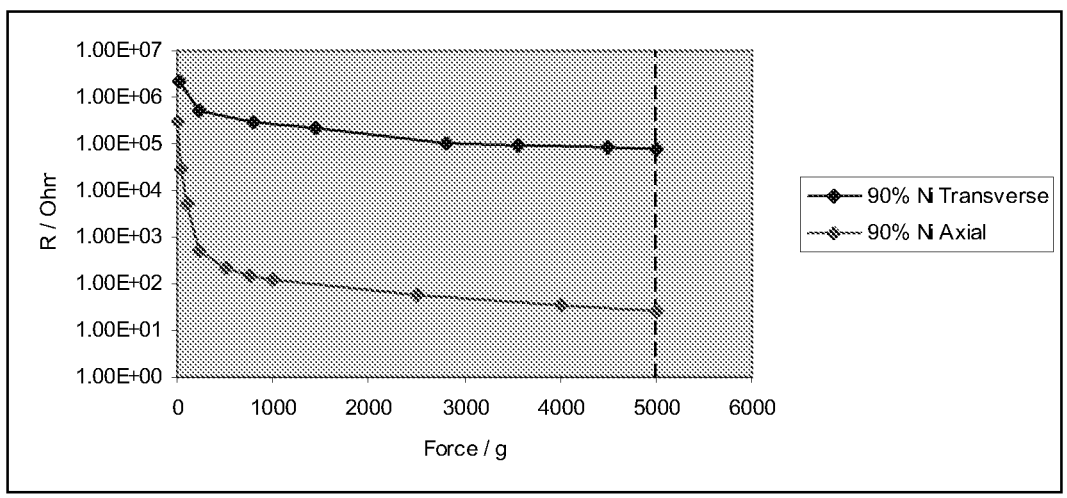
Figure 11C:
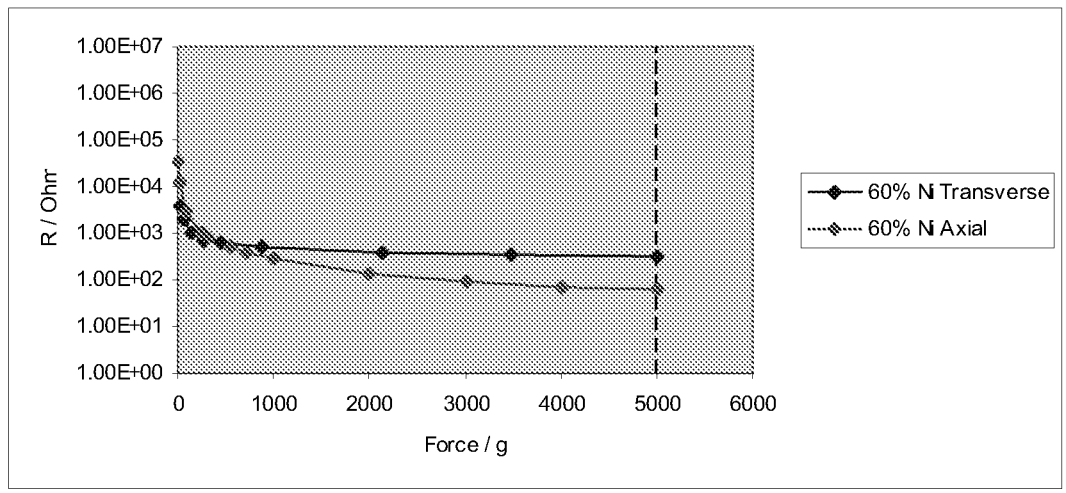
Figure 11D:
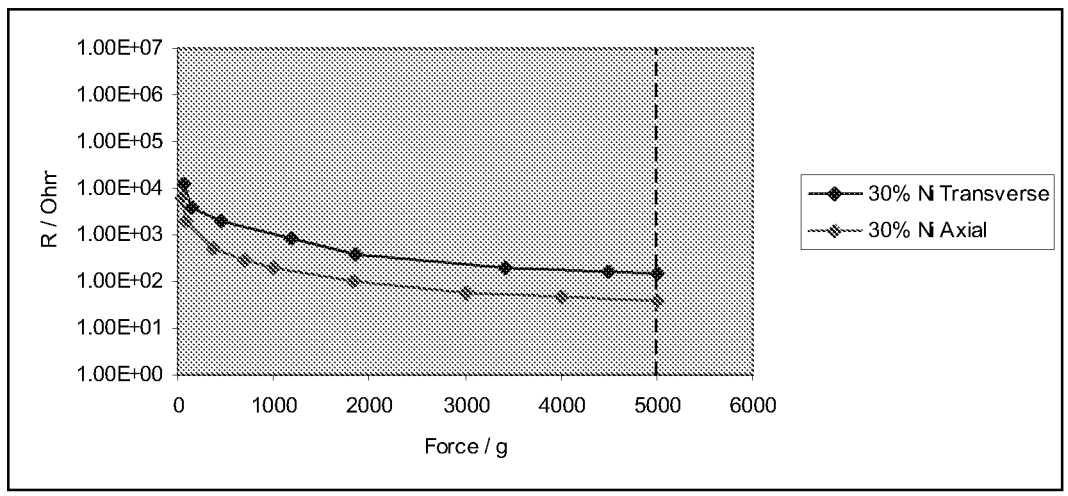
Figure 11E:
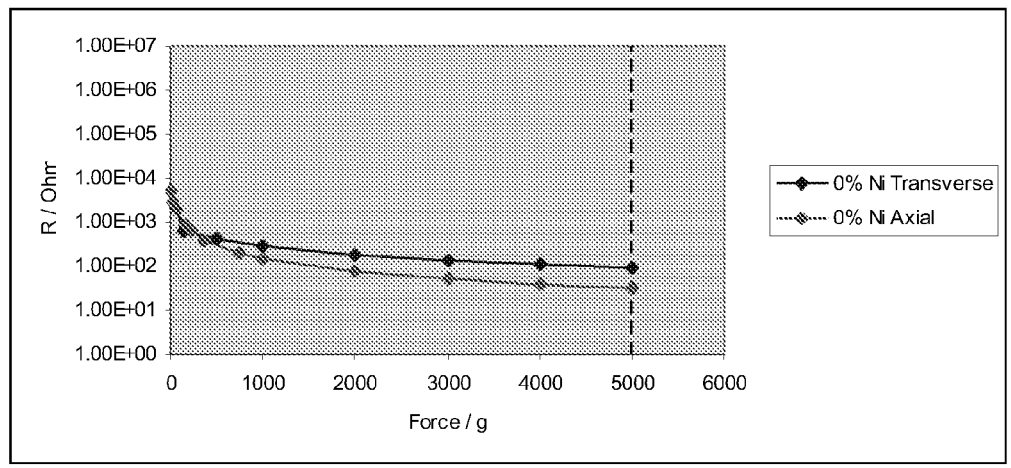

FIGS. 11a to 11e show the result of comparing transverse and axial resistance-force behaviour. From these graphs it can be seen that the samples do not exhibit the same resistance-force behaviour when resistance is measured in the transverse and axial directions. In FIG. 11a the sample contains no FT-2000 and therefore shows the response of quantum tunnelling composite of the prior art. The graphs illustrated in FIGS. 11b to 11e show that by changing the relative amounts of Ni123 and FT-2000 different responses in axial and transverse resistance-force response can be generated. This may be of particular use in the manufacture of force sensors as a response may be tailored to an orientation of resistance measurement.

Figure 12:
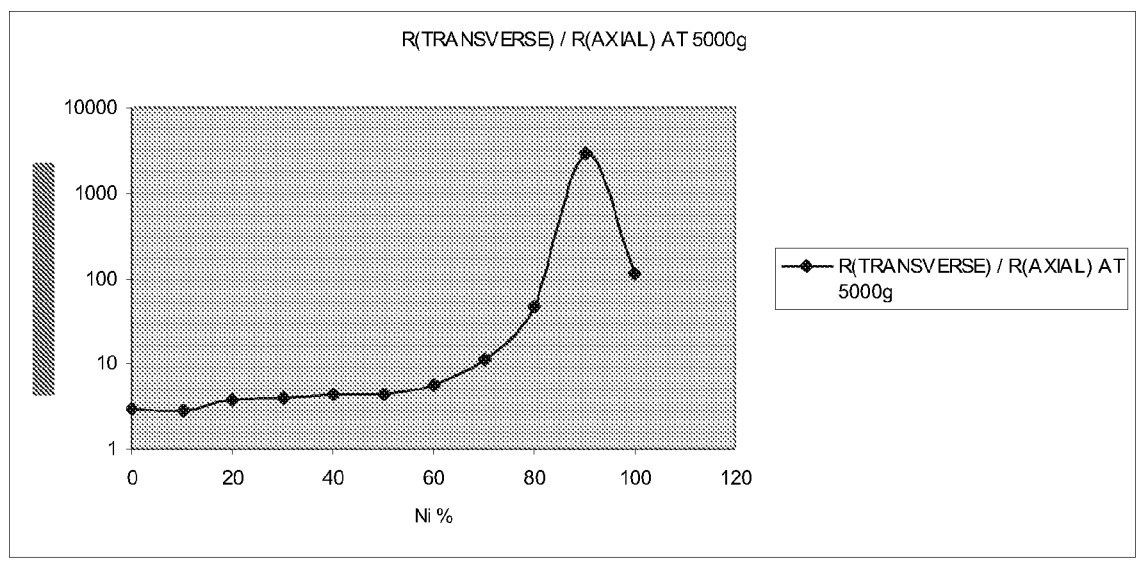

Referring now to FIG. 12, this graph illustrates the change in the ratio $R_t:R_a$ with increasing Ni123 content. Between approximately 50% and 90% Ni123 the relationship is super exponential. At 90% Ni123 content the relationship changes with the ratio $R_t:R_a$ falling. The fact that this relationship changes for a quantum tunnelling composite having a Ni123 content of 90% or greater means that such a compound may be useful in the manufacture of sensors where a particular output is desired.

Figure 13:
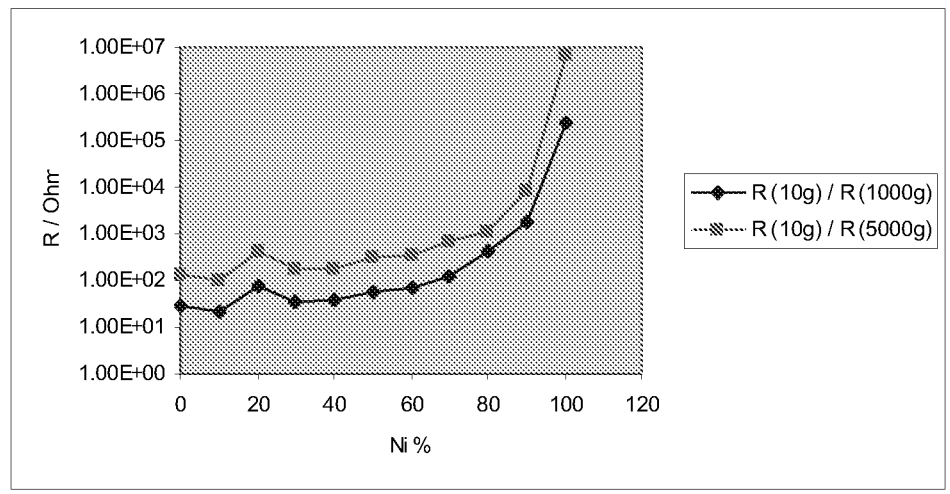
Figure 14:
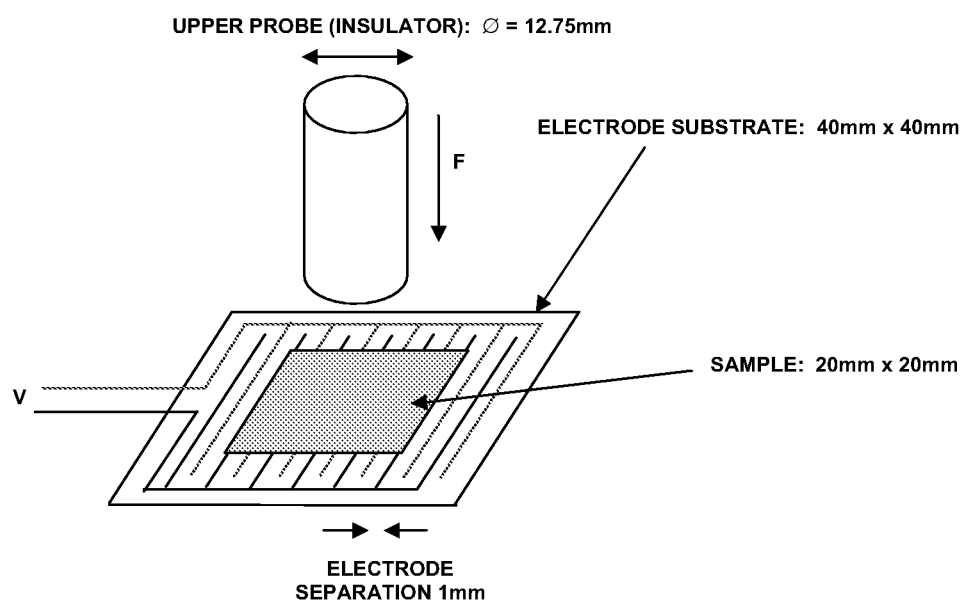
FIG. 14 is a schematic representation of the method by which resistance is measured transverse to the direction of application of force.
Figure 15:
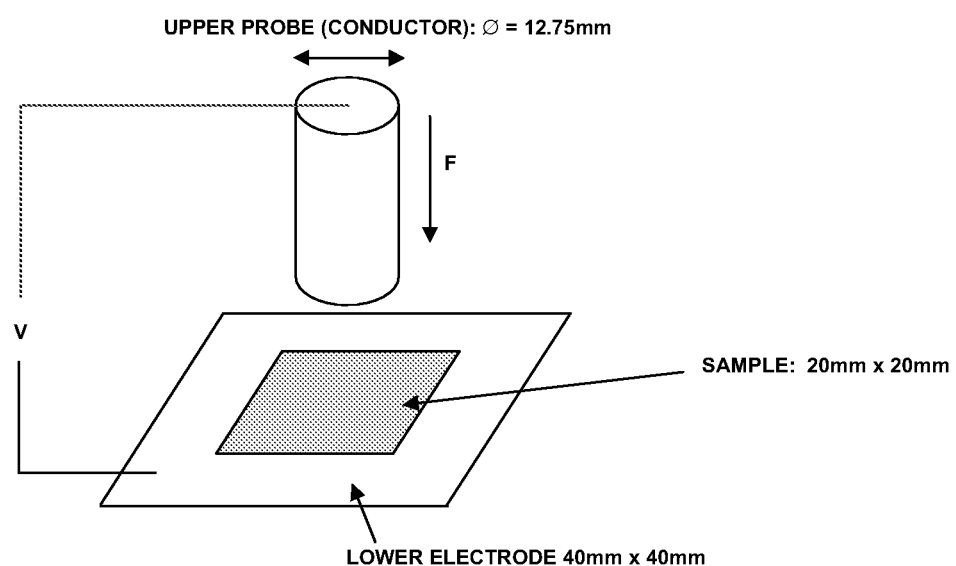
FIG. 15 is a schematic representation of the method by which resistance is measured axial to the direction of application of force.

Referring now to FIG. 13, this graph illustrates the ratio of resistances measured axially to the direction of application of force to the sample v increasing Ni123 content for the forces 10 grams/1000 grams and 10 grams/5000 grams. The data is taken from the graph shown in FIG. 9.

In Experiment II a solvent- or water-based polymer binder is used, whereas in Experiment I the polymer is non solvent-based requiring one of the methods of WO 98/33193 and WO 99/38173.

Whilst the examples are described with reference to Ni123 and FT-2000, any other suitable materials may be used.

In general, the void-bearing filler can be one or more metals or semiconductors, other conductive or semiconductive oxides, or intrinsically conductive or semiconductive organic or inorganic polymers. Thus it is suitably selected from powdered forms of the metallic elements or their electrically conductive alloys or reduced oxides either on their own or together. More specifically it is one or more of titanium, tantalum, zirconium, vanadium, niobium, hafnium, aluminium, silicon, tin, chromium, molybdenum, tungsten, lead, manganese, beryllium, iron, cobalt, nickel, platinum, palladium, osmium, iridium, rhenium, technetium, rhodium, ruthenium, gold, silver, cadmium, copper, zinc, germanium, arsenic, bismuth, boron, scandium and metals of the lanthanide and actinide series. The void-bearing filler can be the basic element in the unoxidised or oxidised state or can be a layer on a carrier core. Preferred void-bearing particles comprise carbonyl-derived metallic nickel. Other examples include dendritic copper.

Similarly, other suitable electrically conductive materials being acicular in shape may be used, which are typically not void-bearing. The acicular material can be one or more metals or semiconductors, other conductive or semiconductive oxides, or intrinsically conductive or semiconductive organic or inorganic polymers. Thus it is suitably selected from powdered forms of the metallic elements or their electrically conductive alloys or reduced oxides either on their own or together. More specifically it is one or more of titanium, tantalum, zirconium, vanadium, niobium, hafnium, aluminium, silicon, carbon, tin, chromium, molybdenum, tungsten, lead, manganese, beryllium, iron, cobalt, nickel, platinum, palladium, osmium, iridium, rhenium, technetium, rhodium, ruthenium, gold, silver, cadmium, copper, zinc, germanium, arsenic, bismuth, boron, scandium and metals of the lanthanide and actinide series. The acicular filler can be the basic element in the unoxidised or oxidised state or can be a layer on a carrier core. Preferred acicular particles comprise titanium dioxide coated with tin oxide which has been doped with antimony. Other examples include carbon nanotubes.

Using solvent or water-based binders allows much simpler processing techniques to be used for the manufacture of the composites, such as bead milling.

Further, the viscosity of composites based on solvent or water-based polymers is relatively low. This property allows the composites to be cast in a number of different wars, in particular by doctor blading, screen printing and by the Mayer bar technique. These techniques cannot be used with the quantum tunnelling compound manufactured according to the methods set out in WO 98/33193 or WO 99/38173.

The use of solvent- or water-based polymers is not limited to composites containing acicular shaped particles.

Introducing a proportion of acicular shaped particles into the composite allows a quantum tunnelling composite having a start resistance to be manufactured. Further, such a composite may be manufactured using the techniques described above.

In order to change the mechanical properties of composite materials produced in accordance with the invention, hardeners may be added.

Another advantage of a quantum tunnelling composite which includes a proportion of acicular shaped particles is that by varying the proportion of acicular shaped particles within the composite the slope of the resistance-force curve can be controlled. When using quantum tunnelling composite of the prior art further electronics is required to achieve such control. As such the quantum tunnelling composite may be tailored to match the performance requirements of specific applications.

The invention claimed is:

1. A polymer composition comprising at least one non-conductive polymer binder and at least first and second electrically conductive fillers, wherein the first electrically conductive filler is comprised of particles having a void-bearing structure, the second electrically conductive filler is comprised of particles which are acicular in shape, and the relative proportions of the first and second electrically conductive fillers in the composition are from 80:20 to 90:10 by volume.

2. A polymer composition according to claim 1, wherein the first filler has a particle size of between 1 and 100,000 nanometers.

3. A polymer composition according to claim 2, wherein the first filler has a particle size of between 10 and 10,000 nanometers.

4. A polymer composition according to claim 1, wherein the aspect ratio of the particles of the second filler is between 1 and 10,000.

5. A polymer composition according to claim 4, wherein the aspect ration of the particles of the second filler is between 5 and 1,000.

6. A polymer composition according to claim 1, wherein the material from which the first filler is made is selected from the group comprising: metals or semiconductors, other conductive or semiconductive oxides, or intrinsically conductive or semiconductive organic or inorganic polymers; powdered forms of the metallic elements or their electrically conductive alloys or reduced oxides either on their own or together; one or more of titanium, tantalum, zirconium, vanadium, niobium, hafnium, aluminum, silicon, tin, chromium, molybdenum, tungsten, lead, manganese, beryllium, iron, cobalt, nickel, platinum, palladium, osmium, iridium, rhenium, technetium, rhodium, ruthenium, gold, silver, cadmium, copper, zinc, germanium, arsenic, bismuth, boron, scandium and metals of the lanthanide and actinide series.

7. A polymer composition according to claim 1, wherein the material from which the second filler is made is selected from the group comprising: metals or semiconductors, other conductive or semiconductive oxides, or intrinsically conductive or semiconductive organic or inorganic polymers; powdered forms of the metallic elements or their electrically conductive alloys or reduced oxides either on their own or together; one or more of titanium, tantalum, zirconium, vanadium, niobium, hafnium, aluminum, silicon, carbon, tin, chromium, molybdenum, tungsten, lead, manganese, beryllium, iron, cobalt, nickel, platinum, palladium, osmium, iridium, rhenium, technetium, rhodium, ruthenium, gold, silver, cadmium, copper, zinc, germanium, arsenic, bismuth, boron, scandium and metals of the lanthanide and actinide series.

8. A polymer composition according to claim 1, wherein the material from which the second filler is made includes a coating.

9. Polymer composition according to claim 8, wherein the coating is one of a conductive and semi-conductive coating.

10. A polymer composition according to claim 8, wherein the coating is selected from the group comprising: metals or semiconductors, other conductive or semiconductive oxides, or intrinsically conductive or semiconductive organic or inorganic polymers; powdered forms of the metallic elements or their electrically conductive alloys or reduced oxides either on their own or together; one or more of titanium, tantalum, zirconium, vanadium, niobium, hafnium, aluminum, silicon, carbon, tin, chromium, molybdenum, tungsten, lead, manganese, beryllium, iron, cobalt, nickel, platinum, palladium, osmium, iridium, rhenium, technetium, rhodium, ruthenium, gold, silver, cadmium, copper, zinc, germanium, arsenic, bismuth, boron, scandium and metals of the lanthanide and actinide series.

11. A polymer composition according to claim 1, wherein the polymer binder is one of solvent-based and water-based.

12. A polymer composition according to claim 1, wherein the polymer binder is non-solvent-based and non-water-based.

13. A force sensor comprising a polymer composition as claimed in claim 1.

* * * * *